United States Patent Office.

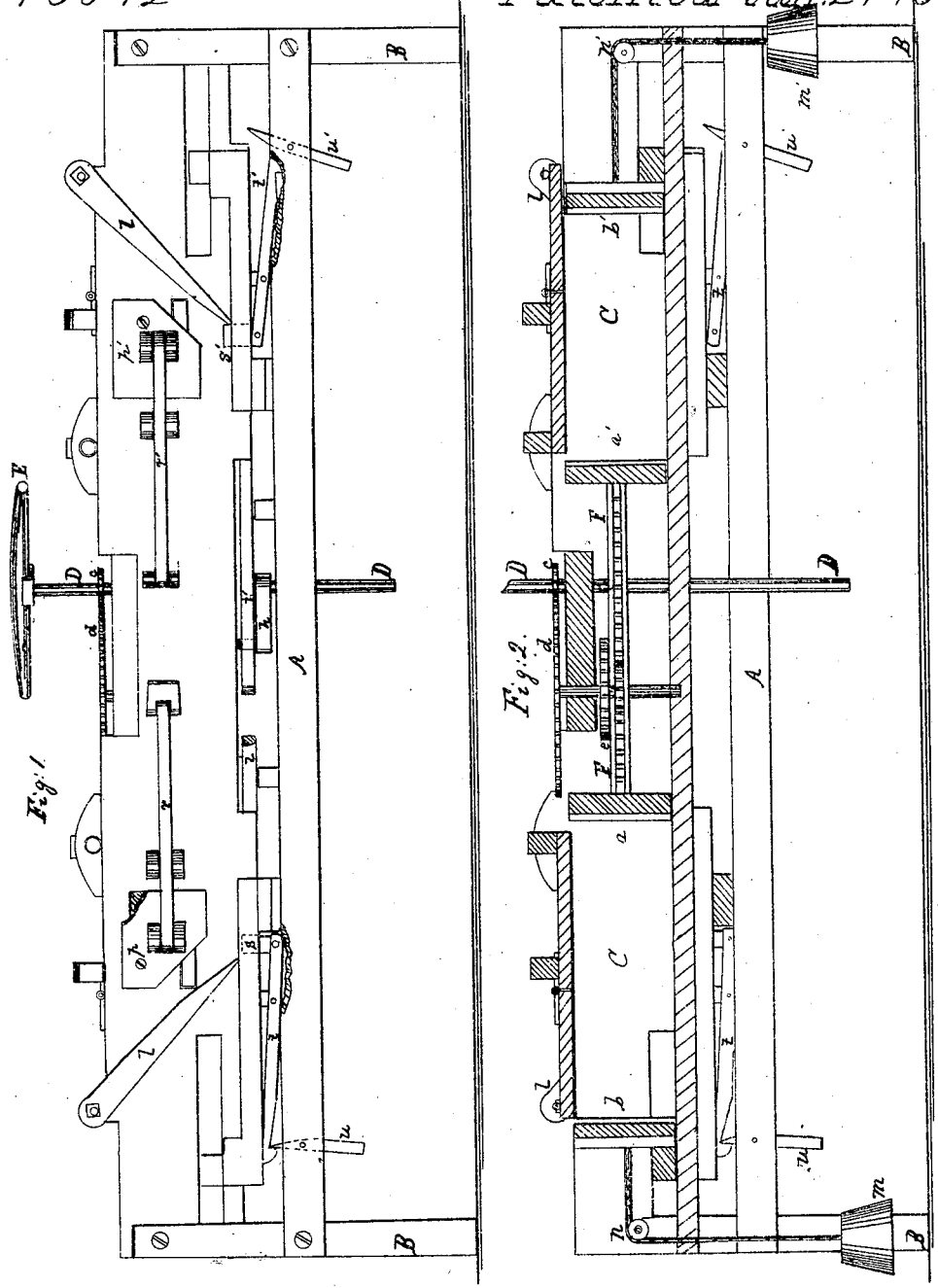

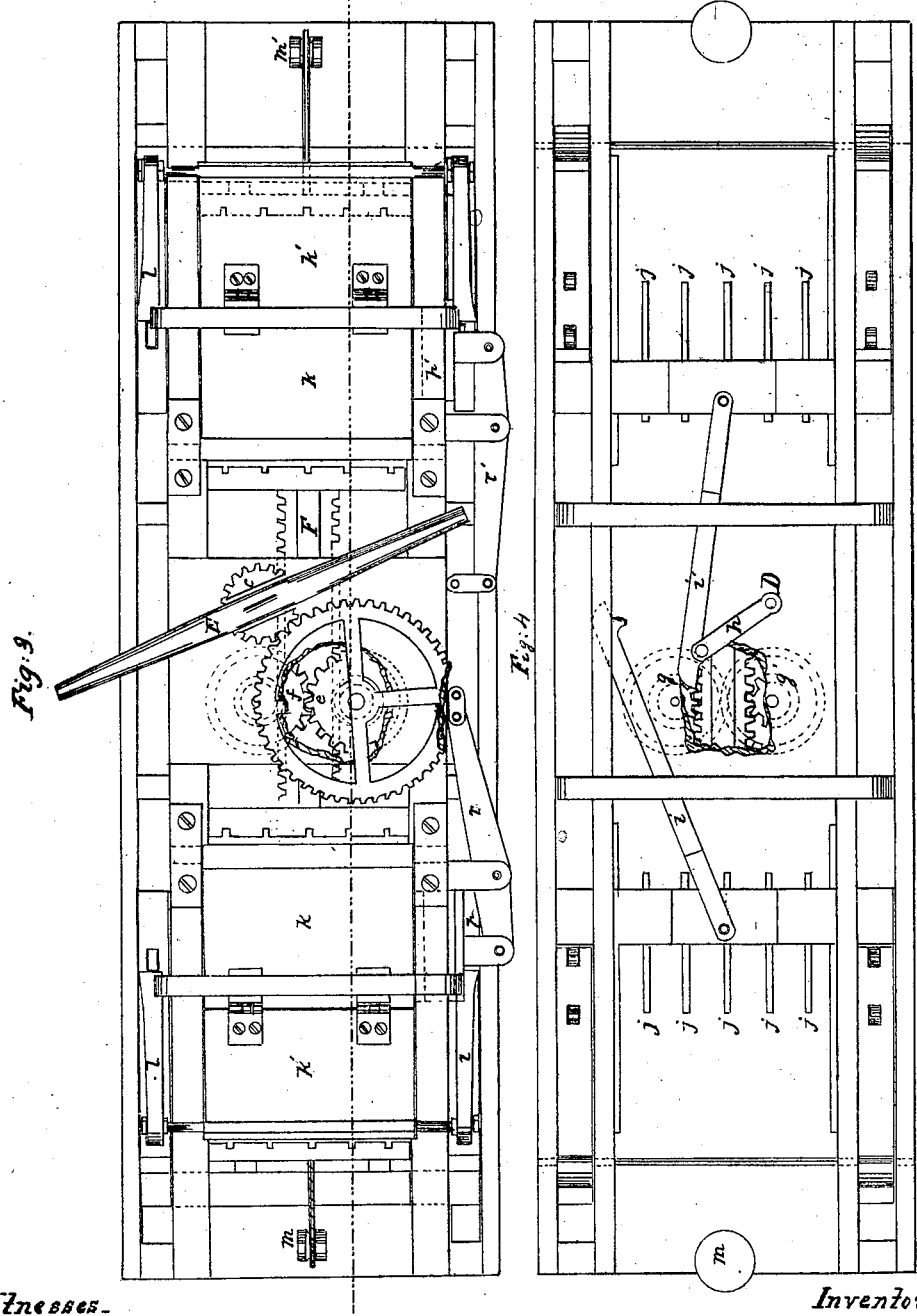

LOUISA J. MAXEY, OF TROY, INDIANA, ADMINISTRATRIX OF THE ESTATE OF EDWARD G. MAXEY, DECEASED, AND WILLIAM R. MASON, OF LEWISPORT, KENTUCKY.

Letters Patent No. 73,542, dated January 21, 1868.

HAY AND COTTON-PRESS.

The Schedule referred to in these Letters Patent and making part of the same.

TO ALL WHOM IT MAY CONCERN:

Be it known that EDWARD G. MAXEY, late of Troy, Perry county, State of Indiana, now deceased, and WILLIAM R. MASON, of Lewisport, Hancock county, State of Kentucky, invented a new and improved Cotton-Press; and we do hereby declare that the following is a full, clear, and exact description thereof, which will enable others skilled in the art to make and use the same, reference being had to the accompanying drawings, forming part of this specification, in which—

Figure 1 is a side elevation.
Figure 2 is a longitudinal vertical section.
Figure 3 is a top view or plan.
Figure 4 is a view of the bottom.
Similar letters of reference indicate like parts.

The nature of the invention consists in constructing a self-packing hay and cotton-press by connecting a number of novel devices and arrangements for producing the desired result of compressing the hay or cotton into compact bales with dispatch and convenience, by the application of comparatively trifling power, one horse or mule being all that is required to do the work of compressing effectively.

The press-frame A is long, and stands on four or more posts, B B, at the corners, upon which is placed a box, from end to end, as wide in the clear as the length required for the bale to be pressed, and as high inside as its thickness. There are two packing-compartments, one at each end, C C, which are formed by four movable head-blocks on each end, $a\ a'$ being the inside blocks and $b\ b'$ the outside blocks. In the middle of the box is an upright spindle or power-shaft, D, which is operated by a sweep, E, fig. 1, placed either above or below the box for working the shaft by mule or horse-power, or it may be moved by any horse-power gearing. On the shaft D is a small pinion, $c$, on the upper side of the packing-box, which meshes into a large wheel, $d$, the spindle of which passes down through the box, and on the inside carries a cog-wheel, $e$, figs. 2 and 3, which meshes into another cog-wheel, $f$, of the same size, under both of which wheels $e$ and $f$ are equal-sized small pinions, $g\ g'$, fig. 4, which work into a double reciprocating rack and compressing-beam, F, and work it on both sides simultaneously, when the shaft D revolves either way, as is intended, by reversing the motion for packing at opposite ends of the box. Under the packing-box, on the shaft D, is a lever-arm, $h$, figs. 1 and 4, which operates alternately on two pitmen $i\ i'$ in the manner to be subsequently explained, which pitmen both connect with the outside head-blocks $b\ b'$ underneath the box. The rack-beam F is attached to the head-blocks $a\ a'$, and works them both ways alternately, when the press is in operation.

In the middle of each baling-compartment C C are slots $j\ j\ j$, fig. 4, which cross the bale for roping or strapping it. The tops of the baling-compartments are double-hinged doors, $k\ k'\ k\ k'$, which are opened and shut, as required, in the operation of packing. Connected with each outside door $k'$, and on both sides of the packing-box, are self-acting apparatus or brakes, $l\ l\ l\ l$, for chocking the outside head-blocks $b\ b'$, when they are up against the compressed bale, and releasing them when the doors $k'\ k'$ are opened after the bale is fastened, which apparatus is operated by the pitmen $i\ i'$, as subsequently explained. Attached to the head-blocks $b\ b'$ are weights $m\ m'$ hanging over the ends of the box by cords running over pulleys $n\ n'$, fig. 2, for drawing back the head-blocks when released after the bale is packed and fastened.

To operate the machine, the hay or cotton is filled at one end in one of the compartments C C, while the doors are open and the head-blocks are separated as far as they can move from each other. When this work is being done, the hay or cotton in the other compartment is being compressed by the movement of the rack-beam F, bearing up the inside head-block at that end against the material pressed. The outside head-block is also moved up against it by the action of one of the pitmen $i\ i'$, which catches by a hook at its end upon another hook on the end of the arm $h$ attached to the driving-spindle D, thus operating both opposite head-blocks simultaneously toward the bale being compressed. When a packing-compartment, C, is being filled, it is done above, with both doors $k\ k'$ thrown wide open, and the hay or cotton pressed down as much as possible to the level of the box. The doors are then closed and fastened down by chocks or bars not shown. After the bale has been compressed and the outer head-block has reached its limit of movement, the step or brake $l$ catches at the lower end against a slipping-block, $s$ or $s'$, which rises by the release of a lever, $t$ or $t'$, from the trip $u$ or $u'$, forming the self-acting apparatus above referred to in connection with the pitmen. This step chocks or holds the head-block fast while the bale is fastened, and when the door $k'$ is opened it is released, and the weight $m$ or $m'$ draws the head-block back to its place when the packing compartment is to be filled again.

The pitmen $i\ i'$, by which motion is given to the outside head-blocks, and the self-acting apparatus above described, are thrown in and out of gear simply by means of a cord. By means of this cord, when one of the pitmen is thrown in gear, the other is thrown out, only one of them being worked at a time. While one of the packing-compartments C C is being filled through the open door, and packed at one end, the hay or cotton in the other end is being compressed. The compressing of a bale having been done, the horse reverses his course and runs the rack F and the inside head-block back, at the same time compressing the material in the compartment last filled. The operations of filling and compressing are repeated and performed alternately and simultaneously. The bales are hooped and fastened in the ordinary way by passing the rope through the slots, the door $k\ k'$ being thrown open, after they are fastened, to get at them and take them out. It will be noticed, also, that on one side of each packing-compartment are slides or trap-doors $p\ p'$, which are set flush with the inside of the box when the bale is packed and compressed, and are moved outward by means of levers $r\ r'$ on the outside, when the bale has been hooped, to relieve the pressure on the ends and let it come out easily, the levers $r\ r'$ being chocked while the bale is being compressed.

Having fully described the construction and operation of this self-acting packing-press, what we claim as new, and desire to secure by Letters Patent, is—

1. We claim the combination of the gearing-wheels $c\ d\ e\ f\ g\ g'$ with the double reciprocating rack and compressing-beam F, constructed and arranged substantially as and for the purposes herein described.

2. We claim the pitmen $i\ i'$, in combination with the outer head-blocks $b\ b'$ and the doors $k'\ k'$, and their self-acting apparatus for chocking the head-blocks, and releasing them when the doors are opened to take the bale out, constructed and arranged substantially as and for the purposes herein described.

3. We claim the relieving-slides $p\ p'$, in combination with the packing-compartments C C, arranged substantially as and for the purpose herein described.

LOUISA J. MAXEY,
*Administratrix of the Estate of E. G. Maxey, deceased.*
WILLIAM R. MASON.

Witnesses:
GEO. SMITH,
I. MADDEN.